United States Patent [19]

Greenbaum

[11] 4,142,325
[45] Mar. 6, 1979

[54] CHANNEL CULTURE ARRAY

[76] Inventor: George Greenbaum, 790 Boylston St., Boston, Mass. 02199

[21] Appl. No.: 842,292

[22] Filed: Oct. 14, 1977

[51] Int. Cl.² .............................................. A01G 9/02
[52] U.S. Cl. .......................................... 47/79; 47/85; 405/45
[58] Field of Search ........................... 47/59–64, 47/48.5, 73.5, 77–81, 85–87, 66; 61/13, 12

[56] References Cited

U.S. PATENT DOCUMENTS

| | | | |
|---|---|---|---|
| 2,183,970 | 12/1939 | Meissl | 47/80 |
| 2,346,029 | 4/1944 | Jennings | 47/80 |
| 2,486,512 | 11/1949 | Armstrong | 47/79 X |
| 2,750,232 | 6/1956 | Szantay et al. | 47/50 UX |
| 3,220,194 | 11/1965 | Lienard | 47/48.5 X |
| 3,309,875 | 3/1967 | Niederwemmer | 47/48.5 X |
| 3,362,106 | 1/1968 | Goldring | 47/79 X |
| 3,872,621 | 3/1975 | Greenbaum | 47/87 |
| 3,877,172 | 4/1975 | Schwab et al. | 47/59 |
| 3,894,355 | 7/1975 | Carothers | 47/48.5 X |
| 3,987,585 | 10/1976 | Greenbaum | 47/85 |
| 4,014,135 | 3/1977 | Greenbaum | 47/86 |

FOREIGN PATENT DOCUMENTS

| | | | |
|---|---|---|---|
| 922106 | 3/1973 | Canada | 47/79 |
| 1150771 | 1/1958 | France | 47/48.5 |

Primary Examiner—Robert E. Bagwill
Attorney, Agent, or Firm—Richard L. Stevens

[57] ABSTRACT

A channel culture device for agricultural is disclosed. A plurality of elongated reservoir channels are provided adjacent growing channels. The reservoir channels which may be above or within the soil, provide metered amounts of water and nutrients to the growing channels through their walls. An exterior channel is provided which forms the perimeter of a soil bed. The exterior channel includes an inner flexible wall which absorbs the lateral pressure of the soil bed acting on it to prevent buckling of the exterior channel.

23 Claims, 21 Drawing Figures

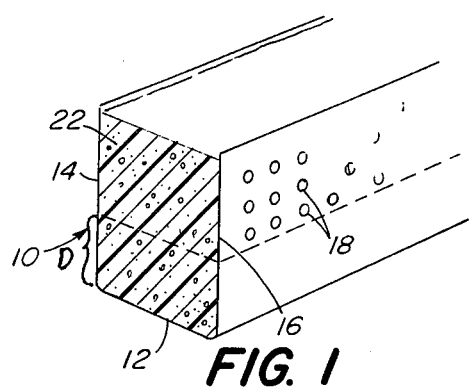
FIG. 1
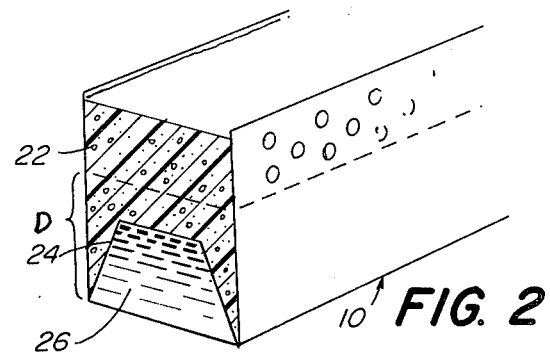
FIG. 2
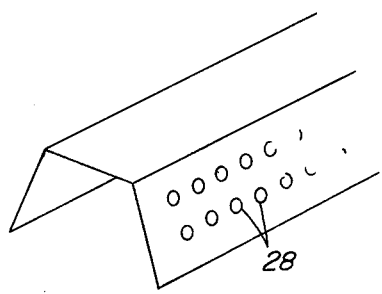
FIG. 3
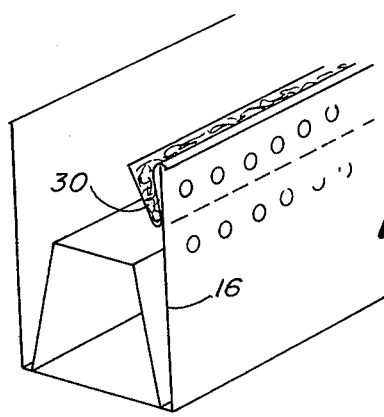
FIG. 4
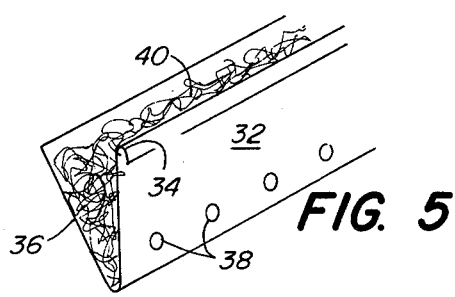
FIG. 5
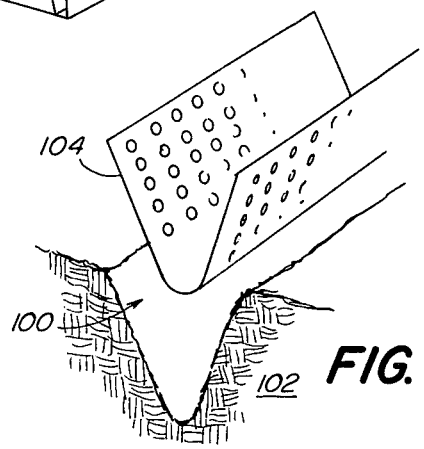
FIG. 7
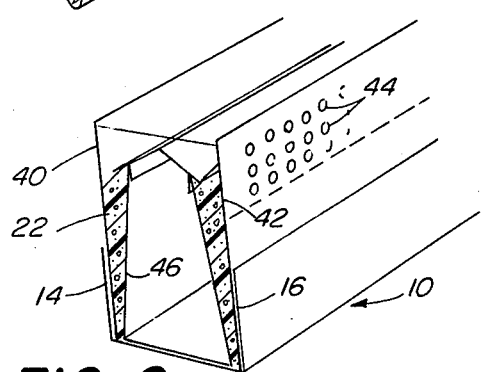
FIG. 6
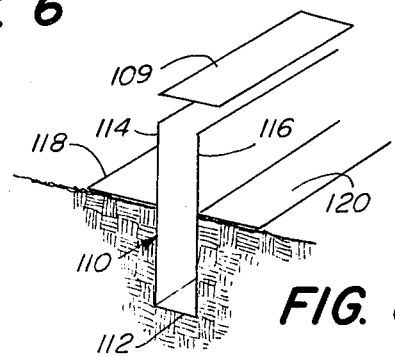
FIG. 8A
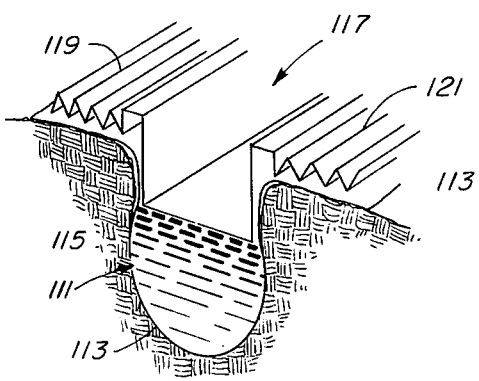

CHANNEL CULTURE ARRAY

BACKGROUND OF THE INVENTION

Channel culture devices which provide multiple plant growth channels are of definite length but shallow depth and narrow individual width have the most potential for increasing the world's food supply. These channels provide maximum plant production for a given supply of fertile soil, water, fertilizer and insecticide. Some or all of which are scarce and at an extreme premium in many parts of the world. The growth channels have a limited volumetric area that can be made just sufficient for the full growth development with any specified plant so that optimum availability of nutrients and water to the plant is obtained. Further the isolation of the channels prevents the leaching and escape of the available supply of nutrients and water into the underlying soil. Isolation also simplifies the problems of cultivation and the control of pests, disease, and weeds.

Various design proposals have been made which some are disclosed and claimed in my copending U.S. Pat. application Ser. No. 512,518 filed Oct. 7, 1974 for *CHANNEL CULTURE DEVICE* and in my recently issued U.S. Pats., Nos. 3,987,587 and 4,014,135 both for *MODULAR CHANNEL CULTURE DEVICE*.

Many modular configurations have thus been suggested. it has been found in practice that most modular channel configurations incur two major drawbacks. Typically they are of a predetermined size and to achieve flexibility of sizes within a particular total assembly have proved cumbersome and expensive. Modular plant devices which have the ability to be extended both in length and breadth through some type of interfitting or interlocking connections and have not exhibited the necessary structural flexibility to form readily modules of different sizes.

More importantly most configurations have resulted in an environment for containing and supporting the plant and plant support systems which allow a modest amount of flow of water downwardly from the top surface and along the walls. Lateral flow of air and water into and from the plant support system in a channel as a practical matter did not occur. These concepts were then felt not to be important in that the total amount of nutrients required to maximize plant growth could be carefully controlled because there would generally be no leaching from the culture device. It has been found that this nonleaching concept although theoretically sound had attendant problems which in many instances outweighed the advantages. For example, when used in small scale, i.e., home, small garden areas, etc., there is a tendency by the user to overwater or overfeed. The accumulated water could not drain properly being sealed on three sides, and this condition deleteriously affected plant growth. In large scale operations unexpected rainfall results in the same problem.

My recent work in this area has established that the concept of increased aeration of the plant support system while providing some structure to minimize complete leaching did not overcome the aforementioned problems. These problems were substantially overcome in my pending U.S. application, Ser. No. 763,821 for *MODULAR PLANT DEVICE*.

The invention of my parent application comprises at least one growing channel such as elongated troughs which have a floor and two walls characterized by being fluid permeable, that is air and water may flow therethrough. The growing channel is flanked by two service channels which function in combination with the growing channel to allow fluids such as air and water to communicate laterally with the plant support system in the growing channel.

Therefore, in my previous work I have stressed the flexibility inherent in the system in which the plants environments may be manipulated with ease and the use of water, fertilizer, etc. held at minimum level.

Field tests of the above devices although excellent for growing purposes resulted in additional improvements which developed an improved service channel, called in this application an interior channel, and also an improved exterior channel which eliminates buckling of exterior walls which sometimes occur when an assembly was completely wetted.

SUMMARY OF THE INVENTION

In my present invention the reservoir and exterior channels may be used in lieu of and as an improvement to the service and exterior channels disclosed in my parent application. Alternatively, the exterior and/or reservoir channels may be used in a soil bed in various configurations.

The present invention provides a channel culture device which has an improved exterior channel to overcome buckling. Reservoir channels are provided which include a liquid and means to transmit the liquid into adjacent growing channels.

My invention broadly comprises a channel culture device which enhances plant growth. The device embodies several aspects.

In one aspect of the invention, an exterior channel is provided which channel defines at least a portion, and preferably all of the perimeter of a soil bed, wherein the exterior channel supports substantially all of the lateral forces for the portion of the soil bed it engages without failure thus maintaining the integrity of the perimeter.

The exterior channel of my invention is used as a perimeter channel either in a soil bed or in combination with other channels. Preferably the exterior channel includes a fluid permeable inner wall, a floor and an outer flexible wall. The flexible wall may comprise a substantially rigid outer side spaced apart from a flexible inner side. The inner side and the outer side to define a chamber therebetween. The relationship of the inner side to the outer side is such that when the stress caused by the soil within the perimeter increases, such as when in a completely wet condition, the inner side will deform within its elastic limits and thus absorb the increased pressure of the entire assembly while preventing buckling or cracking of the outer side. Preferably the inner wall of the chamber is two to ten times more flexible than the outer surface. The outer wall may also be formed from a foam-like material which material can be laminated to the outer surface.

In another aspect of my invention a growing channel is provided in combination with a reservoir channel. Either a surface reservoir channel or a subsoil reservoir or both. The growing channel may be an integral channel as described in my aforementioned application or a portion of a soil bed.

The surface reservoir channel comprises side walls and a floor. The upper portion of the side walls are fluid permeable. The channel is closed and sealed at either end and filled at least partially with a material which is hydrophilic or provides capillary action for a liquid such as water including chemical additives or nutrients to be employed to enhance the growing of plants. In a preferred embodiment, a fluid permeable support is received in the channel and defines a chamber which is advantageously filled only with liquid. The hydrophilic material is placed in the channel on the support.

The channel is adapted to transfer metered amounts of liquid and air to an adjacent growing channel. The growing channel may be a channel as described in my parent application or may be a portion of a soil bed adjacent to the interior channel.

A subsoil reservoir channel is received in the soil adjacent a growing channel. It includes permeable walls which define a reservoir and allow metered amounts of liquid to flow to the adjacent growing channels. In a preferred embodiment a subsoil reservoir channel is structured for controlling the flow of water into the subsoil reservoir. An arrangement of reservoir channels and growing channels to be extended laterally and longitudinally may be accomplished in accordance with the teachings of my parent application.

In a still further embodiment of my invention, end caps are provided to seal and close the ends of either the exterior or surface reservoir channels. The end caps in one embodiment include one or more extending wings which are uniquely suited to defining the width of an enlarged growing channel particularly in a soil bed.

In a still further aspect of the invention a capillary carpet is provided for a soil bed of growing channels. The growing channels are placed on a bed of hydrophylic material which material in turn lies on an impermeable surface. The floors of the growing beds are permeable whereby stored liquid in the capillary carpet may migrate to the plant support system in the growing channel. Exterior channels preferably form the perimeter and reservoir channel, either surface or subsoil may be used.

BRIEF DESCRIPTION OF THE DRAWINGS

FIG. 1 is a perspective illustration of an embodiment of a basic surface reservoir channel of my invention;

FIG. 2 is a perspective illustration of an alternative embodiment of FIG. 1 employing a support member used in a reservoir;

FIG. 3 is a perspective illustration of a support member of FIG. 2;

FIG. 4 is another alternative embodiment of the channel of FIG. 2 including a dribble trough;

FIG. 5 is a perspective illustration of the dribble trough used in FIG. 4;

FIG. 6 is a still further perspective illustration of a further embodiment of the channel with an increased reservoir capacity;

FIG. 7 is a perspective illustration of a basic subsoil reservoir channel;

FIGS. 8a and 8b are perspective illustrations of rigid subsoil reservoir channels;

DESCRIPTION OF THE PREFERRED EMBODIMENTS

Figure 9:
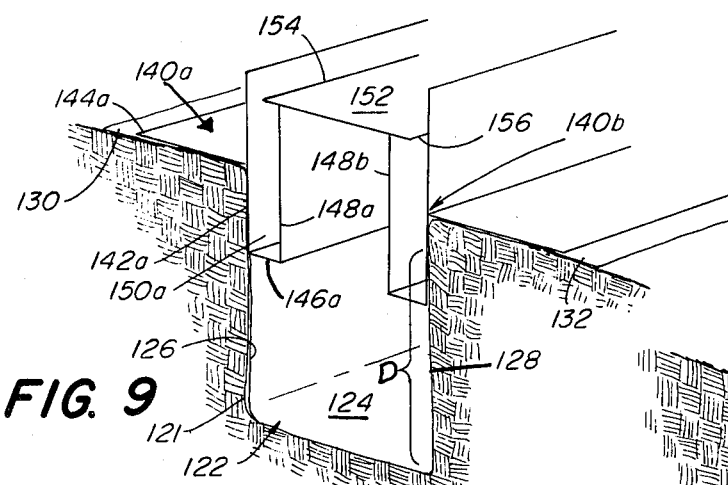
FIG. 9 is a perspective illustration of a preferred subsoil reservoir channel.

As with my parent application, one of the primary purposes of my invention is the increased flexibility in designing a channel culture system of both structural adaptability and flexibility; and providing lateral liquid feeding and aeration of the root system of a plant. The service channel described in my parent application provided for lateral fluid transfer from the service channel to an adjoining growing channel. The reservoir channel, as the term is used in this application, is an improvement of the service channel and in addition to providing the lateral liquid and air transfer also provides the liquid, such as water supplemented by nutrients, which metered into the adjacent growing channel over an extended period of time.

The interior and reservoir channels described herein are of a U-shaped configuration. This configuration allows the channels to rest on or within any substantially flat surface and provides ease in extending the channels longitudinally and laterally with similar channels. The material of construction of any channel is basically of such strength that when used as a growing channel it can retain between its opposed walls the plant support system in a wetted condition together with the forces acting on the walls by any plant which may be grown in the particular system. Similarly, when used as a reservoir channel or exterior channel it can retain between its walls water and fill material without being deformed beyond its elastic limits. Any high and low density polyethylenes, high impact styrene, concrete, etc. may be used.

As used herein the term "fluid permeable" is intended to mean liquid and air permeable.

The composition of the fluid permeable portions of a channel may be of any conventional material such as sieve, porous, ceramic, glass or sintered material. Cellular material consisting essentially of interconnected individual cells of the open cells or breathable type, that is it permits the passage of gas or liquid therethrough, is suitable. Further any material of construction with the appropriate sized apertures may also be used and is fluid permeable.

Referring to FIG. 1, a basic surface reservoir channel is shown at 10 and comprises a floor 12 and walls 14 and 16. The upper portions of the walls 14 and 16 are apertured at 18 and thus are fluid permeable. The distance "D" from the floor 12 to the lowermost row of apertures 18 is the depth of the liquid in the channel. The channel 10 is filled with a hydrophilic material 22 which has a capillary property for the liquid disposed in the channel 10, such as "P" gravel, coarse sand etc. The function of the channel will be explained more clearly in reference to FIGS. 12–16.

In FIG. 2, a support member 24 is inserted in the channel 10. This defines a zone 26 where water can collect in the channel. The fill 22 is supported by the member 24 and extends to the bottom of the channel. FIG. 3 more clearly illustrates the support member 24 which is fluid permeable by reasons of the apertures 28. Thus, when the channel is filled with water to the depth "D" the fill will be saturated and the chamber within the zone completely filled with water. The capillary action of the fill will continue to transmit water through the walls 14 and 16 of the channel until such time as the water supply is exhausted.

FIG. 4 illustrates a further alternative embodiment of the interior channel 10 wherein a dribble trough 30 is secured to the wall 16. The trough 30 is shown in greater detail in FIG. 5 and includes an apertured vertical wall 32 terminating at its upper edge as a U-shaped lip 34 and joined at its lower edge to an inwardly and upwardly extending wall 36. The wall 32 is apertured at 38 which apertures are in register with the upper row of apertures 18 of the wall 16. Any material 40 such as fertilizer, lime, growth regulator, etc. may be placed in the trough and when watered will dribble through the registered apertures 18 and 34 and into an adjacent growing channel.

For plants which require a higher amount of moisture a modified reservoir channel is illustrated in FIG. 6. The standard channel 10 is used. Vertical walls 40 and 42 are received within the channel 10 and adjacent the walls 14 and 16. The walls 40 and 42 close the apertures 18 and apertures 44 are formed on the upper portion of the vertical walls. an extended support member 46 is received within the walls 40 and 42 and fill 22 is placed on the support member 46. This embodiment functions exactly as the embodiment of FIG. 2.

A subsoil reservoir channel of my invention is illustrated in FIGS. 7-9. In FIG. 7, a trench 100 is formed in a soil bed 102. The trench 100 is lined with a permeable sheet material 104 which is sealed at either end. The liner 104 is filled with water which leaches through the permeable walls of the liner to an adjacent growing channel. A suitable material for this purpose would be any flexible plastic film such as polyethylene sheeting of from 2 to 4 mils. Preferably apertures of sufficient size are uniformly formed in the sheet material 104 over its entire surface to allow the channel when completely filled to drain in seven (7) days with no loss from evaporation. This would be for a channel which is placed approximately four inches into the ground and is approximately three inches in width. Obviously as the depth and width of the channel increases or decreases the size of the apertures and number of apertures in the surface will vary. Typically the width is from one to six inches and the height from six to twenty-four inches. Also the size and the distribution of the apertures may vary depending upon the metering rate desired.

In FIG. 8A a profile extruded rigid plastic channel 110, such as thermosetting plastic, cement or fired clay is formed and comprises a floor 112 joined to walls 114 and 116. Wings 118 and 120 respectively extend substantially perpendicular from walls 114 and 116. The portions of the channel walls 114 and 116 below the wings are received in a trench with the bottom surface of the wings 118 and 120 resting on the surface of the soil bed to provide stability. The portion of the walls 114 and 116 below the wings are permeable and preferably are apertured as described above for FIG. 7. After the channel 110 is filled with water a cover 109 is secured to prevent loss of water through evaporation and the ends are sealed in any suitable manner.

In FIG. 8B a subsoil reservoir 111 is shown and comprises a plastic flexible sheet material 113, such as used in FIG. 7, received in a trench formed in a soil bed 115. The material 113 extends over the surface of the soil bed on either side of the trench. A permeable trough 117 having extending fluted lateral wings 119 and 121 engages the upper portions of the material 113. The wings 119 and 121 overlay and grip the material 113 which extends over the soil bed 115 to prevent the material from slipping. The lined trench is filled with water. When the adjacent growing channels tend to lose the moisture then as described for FIG. 7 the water in the trench slowly leaches out or is metered into the adjacent growing channels. The trough 117 is permeable such that natural rain water may fill the trough and flow into the trench. The trough prevents foreign material from entering the reservoir which would tend to clog the passages in the material 113 and the fluted wings secure the material in place.

For FIGS. 7-9, that is the subsoil reservoir channels, the upper portions of the permeable liners may serve two functions. The first, of course, to meter water into the adjacent growing channel. The second is when the water level in the trench drops ground water will flow in a reverse direction through the liner and into the reservoir. For this purpose the apertures in the upper portion of a liner may be greater than apertures in the lower portion to provide a greater flow rate.

Figure 14:
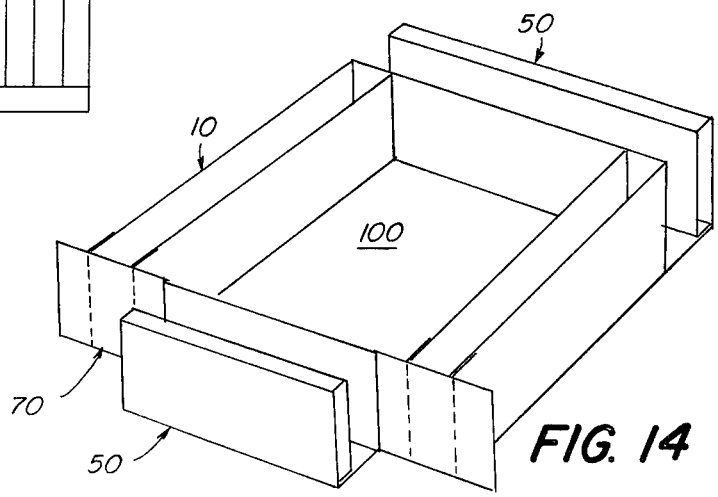
FIG. 14 is a perspective illustration of the use of at least two interior channels supporting an enlarged growing channel and using the exterior channel to form the perimeter.

In FIG. 9, a trench 121 is formed in a soil bed. A flexible permeable plastic liner 122 such as used in FIG. 14 is received in the trench forming a floor 124 and walls 126 and 128 which walls turn outwardly at upper edges forming flexible wings 130, 132 lying on the surface of the soil bed. Rigid wall assemblies 140a and 140b are received in the upper portion of the liner 122. Each assembly being identical only one will be described in detail. Assembly 140a comprises a vertical wall 142a extending above and below the surface of the soil bed. A wing 144a extends laterally outward from the wall 142a and overlays at least a portion of the flexible wing 130. The wall 142a and the wing 144a form an L-shaped step in which is placed a material such as rock or gravel to stabilize the assembly 140a. A floor 146a extends inwardly and is joined at one side to the bottom edge of the wall 142a. An inner permeable wall 148a extends vertically upward from the other side of the floor 146a. The wall 142a, floor 146a and wall 148a define a channel 150a.

When the assemblies 140a and 140b are in place the liner is filled with water up to the level "d" as shown. A cover 152 is placed on the upper edges of the inner permeable wall 148a and 148b with the edges of the cover 154 and 156 spaced apart from the inner surface of the walls 142a and 142b. As with FIG. 8a the cover reduces evaporation losses. In this embodiment the cover 152 also prevents foreign material from falling into the reservoir and also directs water, such as rain water, to the channels 150a and 150b and the water flows through the permeable walls 148a and 148b and into the trench. The channels 150a and 150b may also be filled with a slow release fertilizer.

As described for the above-referenced reservoir channels the channels described for FIGS. 7-9 may be used in combination with exterior channels as described hereinafter, interior channels as described before or solely in a soil bed.

Figure 10A:
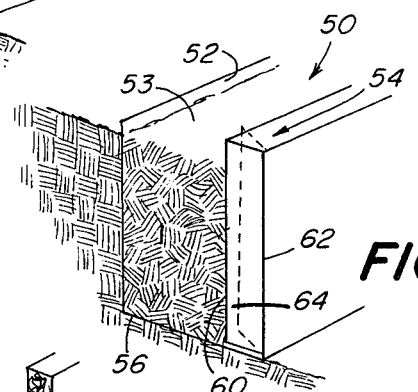
FIGS. 10a and 10b are perspective illustrations of exterior channels of my invention.
Figure 15:
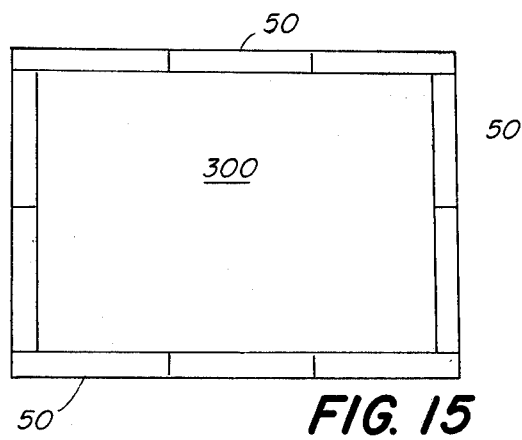
FIG. 15 is a plan view wherein the exterior channel is used to form a perimeter of a soil bed.
Figure 19:
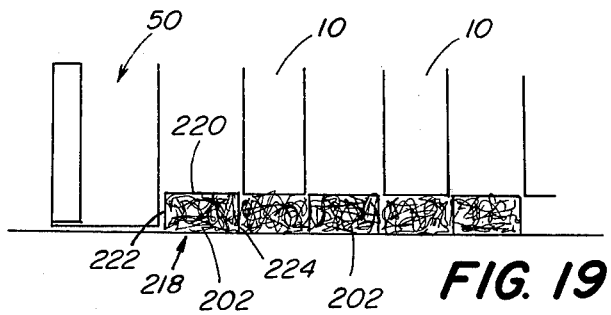

An exterior channel 50 employed with various aspects of my invention is shown in FIGS. 15 and 19. Referring to FIG. 10a, the channel 50 comprises an inner fluid permeable wall 52 and an outer elastically deformable wall 54 and a floor 56. The open channel may be filled with gravel, sand, soil, etc. 53 to provide a firm and stable footing. The wall 54 includes inner side 60 and outer side 62 and a chamber 64. The wall 54 functions as a pneumatic cushion. The entire channel is preferably formed from a single sheet of material such as one eighth" thick high impact polystyrene, although different combinations of materials may be used, and the distance between sides 60 and 62 is typically one-half the distance between side 60 and wall 52 when the channel is from four to ten inches in total width and six to eighteen inches in height. When the soil bed or channels adjacent the channel 50 creates an increase in pressure the side 60 deforms within its elastic limits to a position as shown in the dotted lines. The material of construction will vary depending upon size and load.

Figure 10B:
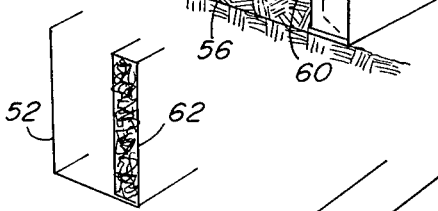

As shown in FIG. 10b, if desired, any foam material such as foamed polystyrene may be laminated to the side 62 and will perform the same function.

Figure 11:
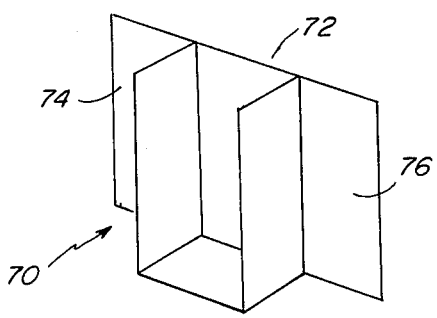
FIG. 11 is a telescopic perspective of an end cap used with the preferred embodiment of my invention.

When the exterior channels are used in a soil bed or a complete modular array the ends must be closed and the ends of the surface reservoir channels must be closed and sealed. End caps as disclosed in my parent application may be used but a preferred end cap is shown in FIG. 11.

Figure 12:
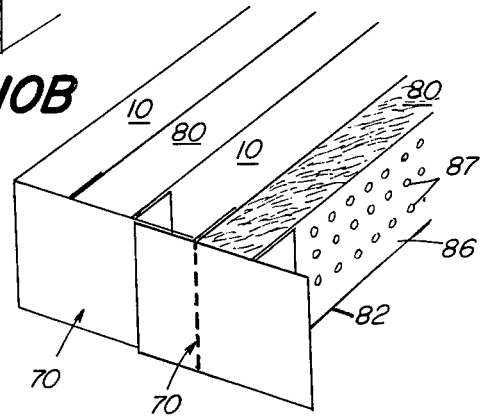
FIG. 12 is a perspective illustration of an interior channel array.

A cap 70 comprises a wall 72 and a U-shaped inwardly extending flange 74 adapted to engage the end of a reservoir or exterior channel. When engaged the juncture may be sealed with caulking compound. Laterally extending wings 74 and 76 provide enhanced stability and may be used for the end of all or a portion of the end of a growing channel, as shown in FIG. 12. The cap 70 may have one wing or none and the wings, where there are two may be of different lengths.

In FIG. 12, there is shown an assembly of surface reservoir channels 10 and growing channels in side-by-side relationship. The channels 10 alternate with growing channels 80, both laterally and longitudinally. The growing channels include a floor 82, walls 84 and 96, the upper portions of which walls are apertured at 87 and include a plant support system 88.

The apertures 87 are in register with the apertures 18 of the walls of the channel 10. End caps 70 are secured by the flange being received without the walls and floor of the channel 10 and sealed such as by caulking to the channels 10. The wings 72 and 74 of adjacent caps overlap and form the ends for the growing channels 80. To extend the channels longitudinally the ends of the channels may be telescopically received one to the other. The channels 10 are sealed at their juncture.

A liquid such as water with nutrients is poured into the channels 10 up to the height defined by "D" thus filling (see FIG. 1) the channel 10. The liquid will, by capillary action, flow through the fill 20, the apertures 18, the apertures 87 of the channel 80 and lastly into the plant support system 88. Of course as the liquid level in the channel 10 drops, air will flow laterally into the plant support system 88 of the channel 80.

FIG. 12 shows alternating reservoir and growing channels. Other combinations can be used such as service channel-growing channel-interior channel-growing channel-service channel-growing channel, etc. in lateral or longitudinal extensions thereof. Other combinations may also be used.

Figure 13:
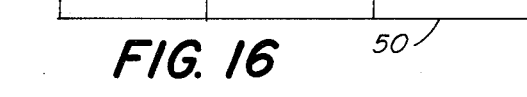
FIG. 13 is a front view of a growing channel and an interior channel.

Referring to FIG. 13 it is possible for the plant support system in the channel 80 to be above the height of the liquid. In this embodiment, air may pass laterally into the plant support system of the growing channel while liquid is metered by capillary action into the plant support system 88. Obviously, as the liquid level decreases then more air will flow laterally into the plant support system 88.

In FIG. 14 a perspective view of a combination of reservoir channels 10 with end caps 70 and exterior channels 50 is shown. The interior channels 10 are spaced such that an enlarged growing channel 100 is defined therebetween. The exterior channel 50 is used to provide the increased lateral support for the growing channel 50 Interior channels 10 are placed within the soil such that there is soil support on either side while of course the exterior channels 50 only have soil contacting them on one side and thus require the elastically deformable outer wall.

Figure 16:
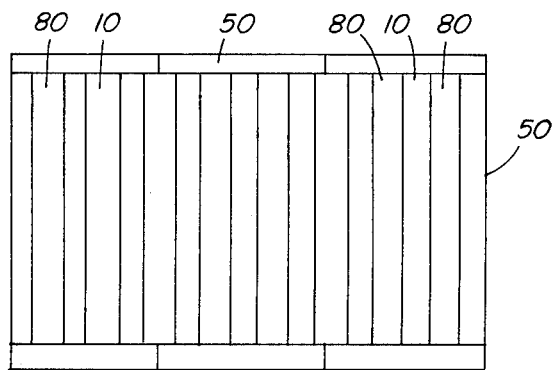
FIG. 16 is a plan view of FIG. 12 with additional interior channels.

FIG. 16 is a plan view of a combination of interior channels 10 and exterior channels 50. FIG. 15 is an alternative view of another arrangement of exterior channels used to define the perimeter of a soil bed 300.

Figure 17:
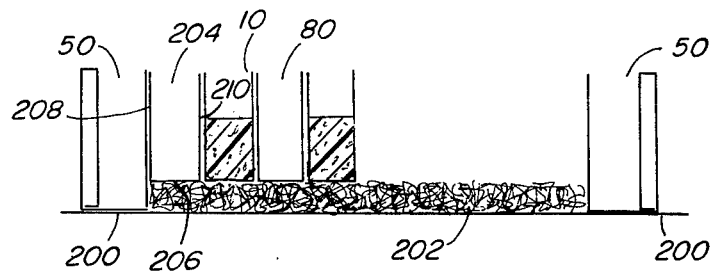
FIG. 17 is a front elevation of a capillary carpet in combination with exterior channels.

A further aspect of my invention is shown in FIG. 17 wherein a soil bed of defined perimeter has a capillary carpet formed at the bottom thereof.

An impermeable sheet 200 extends beyond the perimeter of the soil bed. The perimeter is formed by exterior channels 50 joined end-to-end in telescopic relationship. Where the exterior channels abut such as at the corners, they are simply abutted and sealed with a suitable caulking compound.

Alternatively, the ends of the reservoir and growing channels may be closed and sealed by end caps 70 as previously described. Thus in this embodiment, the end caps would then form walls at the longitudinal ends of the channels rather than the exterior channels.

The first and last channels in any channel array where they are aligned in alternating parallel side-by-side relationship are typically growing channels. If no exterior channels 50 are used in that embodiment the outer sides of the first and last channels and the walls formed by the end caps 70 would define the perimeter of the soil bed. The impermeable sheet material 200 would then be sealed to the bottoms of these walls and outer sides.

In this preferred embodiment the impermeable sheet material extends beyond the exterior channels 50 which form the perimeter. A hydrophilic material 202 is laid on the sheet 200. Preferably the sheet 200 is sealed to the bottom of the channels 50 along their entire perimeter. The material 202 is then saturated with water.

A growing channel 204 having a permeable floor 206 and permeable walls 208 and 210 is placed on the carpet. One channel 204 is disposed between an exterior channel 50 and a reservoir channel 10.

Figure 18:
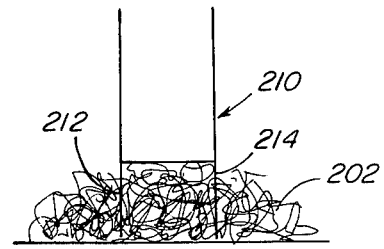
FIG. 18 is a front elevation of a modified growing channel used with the carpet of FIG. 17; and, FIG. 19 is a front elevation of an alternative embodiment of FIG. 17.

In FIG. 18 a modified growing channel 210 is illustrated having depending permeable lower walls 212 and 214 which provide added stability.

In FIG. 19 a growing channel 218 having both a permeable floor 220 and depending legs 222 and 224 but no upper walls, rests on the sheet 200. The width and height of the channel 220 is defined by the opposed walls of adjacent channels.

As with the other described embodiments, any combination of exterior channels and reservoir channels whether above the surface or within the soil bed may be used.

What is claimed is:

1. A channel culture device which comprises:
   a flexible fluid permeable sheet material received in and lining a trench formed in a soil bed, the soil bed adapted to support a plant support system; the sheet material having portions extending laterally outward on the surface of the soil bed;
   a trough-like fluid permeble channel having vertically extending walls, a bottom wall, and wings extending laterally therefrom, the channel received in the upper portion of the trench, the wings engaging the laterally extending portions of the sheet material to secure the sheet material whereby fluids may flow through the trough-like channel and into the lined trench.

2. A channel culture device which comprises:
   a reservoir channel received in a trench formed in a soil bed, a permeable sheet material lining the trench and having portions extending laterally outward on the surfce of the soil bed, the channel having permeable vertical walls in spaced-apart parallel relationship extending into the soil bed and upwardly beyond the surface of the soil bed, portions extending laterally outward from the vertical walls and engaging the sheet material; and
   means forming a chamber extending inwardly of and on at least one of the channel walls, said chamber being in fluid flow communication with the lined trench.

3. The device of claim 2 which includes a chamber formed on each of the inner walls, the chambers having inner opposed walls which define an opening therebetween,
   means to close the opening, said means supported by the inner opposed walls and spaced apart from the vertical walls whereby liquid falling on the reservoir channel will strike said means to close and flow into the chambers rather than directly into the trench.

4. A channel culture device which comprises:
   a plurality of elongated growing channels each having permeable side walls and a floor, and adapted to contain a plant support system, a plurality of elongated reservoir channels each having side walls and a floor, at least a portion of the side walls of the reservoir channels being permeable, said permeable portions of the walls of the reservoir channels being adjacent to the walls of a next succeeding growing channel, the reservoir channels including means to store a predetermined amount of liquid therein which liquid may flow from the reservoir channels to the next succeeding growing channel;
   a liquid impermeable surface spaced apart from the floors of the growing and reservoir channels and defining a zone therebetween, hydrophilic material disposed in the zone and contacting both the floors of the growing and reservoir channels and the impermeable surface, the growing channels and reservoir channels aligned in parallel side-by-side relationship, an outer side of the first channel forming a portion of the perimeter of the device and an outer side of the last channel forming a portion of the perimeter of the device;
   means to form at the ends of the channels perimeter walls which close and seal the channels, said walls being transverse to the longitudinal axes of the channels and combining with the outer sides of the first and last channels to form the entire perimeter of the device; and,
   further wherein the impermeable surface is sealed to the bottom edges of the perimeter walls and the outer sides.

5. The device of claim 4 wherein the upper portions of the walls of the reservoir channels are fluid permeable and the lower portions of the walls and the floor are fluid impermeable, a hydrophilic material is disposed in the reservoir channel in fluid flow communication with both the liquid and the upper permeable portions of the walls, the liquid in the reservoir channel wetting and flowing through the hydrophilic material through the fluid permeable portions of the walls and into the adjacent growing channel.

6. The device of claim 5 wherein the upper portions of the walls of the reservoir channels are apertured.

7. The device of claim 6 wherein at least one of the reservoir channels includes a support member received therein, the support member being fluid permeable and the hydrophilic material being disposed on the support member.

8. The device of claim 7 wherein the support member includes a plurality of apertures.

9. The device of claim 4 wherein at least one reservoir channel includes a dribble trough, the dribble trough of an elongated V-shaped configuration and having a plurality of apertures on one wall, the trough secured to the reservoir channel, said apertures being in communication with the permeable portion of the wall of the reservoir channel, the dribble trough when filled with a material will allow water to wet the material and dribble through the walls of the reservoir channel and into an adjacent growing channel.

10. The device of claim 4 wherein the growing channels include sides depending from the channel floor.

11. The device of claim 4 which includes an exterior channel, said exterior channel being solely responsive to the lateral pressure exerted by an abutting channel, the exterior channel comprising a floor and an inner wall and an outer wall, the inner wall abutting the channel, the outer wall having a rigid outer surface and an elastically deformable inner surface, means disposed between the inner wall and the inner surface to transmit the forces acting on the inner wall to the inner surface, the inner surface deforming with its elastic limits absorbing the forces such that the outer rigid surface will not deform.

12. The device of claim 11 wherein exterior channels abut the outer sides of the first channel and the last channel.

13. A channel culture device which comprises:
    at least one elongated growing channel;
    an elongated exterior channel, the exterior channel being solely responsive to the lateral pressure exerted by the adjacent growing channel which growing channel has side walls and a floor, the exterior channel comprising a floor and an inner wall and an outer wall, the inner wall abutting the growing channel, the outer wall having a rigid outer surface and an elastically deformable inner surface, means disposed between the inner wall and the inner surface to transmit the forces acting on the inner wall to the inner surface, the inner surface deforming within its elastic limits absorbing the forces such that the outer rigid surface will not deform when the growing channel exerts its maximum force on the exterior channel.

14. The device of claim 13 which includes a plurality of exterior channels joined longitudinally, the one end of a first channel received telescopically in the other end of a next channel.

15. The device of claim 13 wherein the inner surface and outer surface of the outer wall are spaced apart and define a pneumatic chamber therebetween.

16. The device of claim 15 wherein in said pneumatic chamber a resilient foam-like material is disposed.

17. The device of claim 13 which includes a plurality of exterior channels defining a perimeter and a plurality of reservoir and growing channels arranged in side-by-side relationship, each reservoir channel comprising a floor and side walls, the upper portions of the side walls being fluid permeable and the lower portions of the side walls and the floor being fluid impermeable, a hydrophilic material disposed in the reservoir channel in fluid flow communication with both a liquid in the reservoir channel and the upper portions of the walls, the liquid in the reservoir channel wetting and flowing through the hydrophilic material through the fluid permeable portions of the side walls and into the adjacent growing channel.

18. The device of claim 17 wherein at least one of the reservoir channels includes a support member received therein, the support member being fluid permeable and the hydrophilic material being disposed on the support member.

19. The device of claim 17 which includes means to seal the ends of all of the channels.

20. An elongated exterior channel forming a portion of the perimeter of a soil bed, the channel being solely responsive to the lateral pressure exerted by the soil bed, the exterior channel comprising a floor and an inner wall and an outer wall, the inner wall abutting the growing channel, the outer wall having a rigid outer surface and an elastically deformable inner surface, means disposed between the inner wall and the inner surface to transmit the forces acting on the inner wall to the inner surface, the inner surface deforming within its elastic limits absorbing the forces such that the outer rigid surface will not deform when the soil bed exerts its maximum force on the exterior channel.

21. The exterior channel of claim 20 which includes a plurality of exterior channels joined longitudinally, the one end of a first channel received telescopically in the other end of a next channel.

22. The exterior channel of claim 20 wherein the inner surface and outer surface are spaced apart and define a pneumatic chamber therebetween.

23. The exterior channel of claim 22 wherein a resilient foam-like material is disposed in the pneumatic chamber.

* * * * *